(12) United States Patent
Markunas

(10) Patent No.: US 7,265,507 B1
(45) Date of Patent: Sep. 4, 2007

(54) ANGULAR POSITION AND VELOCITY ESTIMATION FOR SYNCHRONOUS MACHINES BASED ON EXTENDED ROTOR FLUX

(75) Inventor: Albert L. Markunas, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 11/358,437

(22) Filed: Feb. 20, 2006

(51) Int. Cl.
*H02P 6/18* (2006.01)

(52) U.S. Cl. .................... 318/254; 318/621; 388/911

(58) Field of Classification Search ........... 318/138, 318/254, 439, 720–724, 609–610, 621, 632; 388/902, 911
See application file for complete search history.

(56) References Cited

U.S. PATENT DOCUMENTS

| | | | |
|---|---|---|---|
| 6,184,647 B1 * | 2/2001 | Oguro et al. | 318/727 |
| 6,552,509 B2 * | 4/2003 | Veltman | 318/807 |
| 6,646,412 B2 * | 11/2003 | Wu et al. | 318/801 |
| 6,967,461 B1 * | 11/2005 | Markunas et al. | 318/700 |
| 2006/0052972 A1 * | 3/2006 | Hu et al. | 702/147 |

* cited by examiner

*Primary Examiner*—Bentsu Ro
(74) *Attorney, Agent, or Firm*—Stephen G. Mican

(57) ABSTRACT

A method of correcting the determination of extended rotor flux using a lag function and a correction algorithm that closely approximates a pure integrator function to correct for lag function errors that can extend the EFS control down to dynamoelectric machine speeds corresponding to as low as 10 Hz electrical frequency.

6 Claims, 5 Drawing Sheets

ANGULAR POSITION AND VELOCITY ESTIMATION FOR SYNCHRONOUS MACHINES BASED ON EXTENDED ROTOR FLUX

FIELD OF THE INVENTION

The invention relates to rotor angular position and velocity sensing systems for mechanical shaft sensorless control of dynamoelectric machines, and more particularly to an improved system for resolving the position of a rotor for a dynamoelectric machine using an estimate of extended rotor flux.

BACKGROUND OF THE INVENTION

As the aerospace industry moves into the more electric era, inverter controlled dynamoelectric machine drives become more common onboard aircraft. Next generation dynamoelectric machine controllers must meet many new system and design challenges including cost reduction and reliability improvement. Shaft sensorless dynamoelectric machine control holds great promise for meeting these challenges.

An aircraft generator is usable as a motor for engine starting when powered by an inverter. To reduce cost and improve reliability, it is very desirable to eliminate the mechanical shaft sensor for the engine starter. A novel sensorless synchronous dynamoelectric machine control based on dynamoelectric machine flux estimation, designated Extended Flux Sensorless (EFS) position sensing, is disclosed in U.S. Pat. No. 7,072,790 to Markunas et al. and hereby incorporated by reference. Markunas et al. defines extended rotor flux, which aligns with the rotor field flux axis. The dynamoelectric machine rotor position and speed are estimated from the extended rotor flux, which is derived from dynamoelectric machine terminal electrical potential and current measurements (FIG. 1), expressed in the α-β two-axis stationary reference frame well known in the electric machine technical community. Ideally, a pure integrator is required to reconstruct the flux. However, in practice, a pure integrator suffers from direct current (DC) drifting, initial value holding, and even stability problems. Markunas et al. proposes to alleviate these problems with a lag approximation to an integrator. A digital phase lock loop (FIG. 2) determines the rotor position and speed from the extended rotor flux. The lag approximation to a pure integrator becomes better at high rotor speeds, asymptotically approaching the characteristics of the integrator at very high speeds. However, at low dynamoelectric machine speeds or equivalently low synchronous electrical frequency, $\omega_e$, the error due to the lag approximation can become unacceptably large.

SUMMARY OF THE INVENTION

The invention comprises a method of correcting the determination of extended rotor flux using a lag function and a correction algorithm that closely approximates a pure integrator function to correct for lag function errors that can extend the EFS control down to dynamoelectric machine speeds corresponding to as low as 10 Hz electrical frequency.

For a system that derives an estimated rotor electrical position $\hat{\theta}_r$ and electrical frequency $\hat{\omega}_r$ for the rotor of a polyphase alternating current (AC) dynamoelectric machine with an extended rotor flux estimation calculation system that generates uncorrected estimated values of extended rotor flux $\hat{\lambda}_{\alpha\_ext\_unc}$ and $\hat{\lambda}_{\beta\_ext\_unc}$ based on derived values of estimated stator flux $\hat{\lambda}_\alpha$ and $\hat{\lambda}_\beta$ the α-β two-axis stationary reference frame using a lag function $$\frac{1}{s+\omega_i}$$

that approximates a pure integrator function $$\frac{1}{s},$$

wherein $\omega_i$ represents a corner frequency of the lag function, and a digital phase lock loop (PLL) to determine values of estimated rotor electrical position $\hat{\theta}_r$ and electrical frequency $\hat{\omega}_r$ based upon the estimated values of extended rotor flux $\hat{\lambda}_{\alpha\_ext}$ and $\hat{\lambda}_{\beta\_ext}$, one possible embodiment of the invention comprises a method of correcting the estimated α-axis and β-axis values of estimated extended rotor flux to more closely approximate values generated with a pure integrator function $$\frac{1}{s}$$

comprising the steps of: dividing the lag function $$\frac{1}{s+\omega_i}$$

corner frequency $\omega_i$ by the estimated rotary frequency $\hat{\omega}_r$ to generate a signal $\omega_i/\hat{\omega}_r$; multiplying the signal $\omega_i/\hat{\omega}_r$ by the derived values of estimated stator flux $\hat{\lambda}_\alpha$ and $\hat{\lambda}_\beta$ to produce signals $(\omega_i/\hat{\omega}_r)\hat{\lambda}_\alpha$ and $(\omega_i/\hat{\omega}_r)\hat{\lambda}_\beta$; adding signal $(\omega_i/\hat{\omega}_r)\hat{\lambda}_\beta$ to $\hat{\lambda}_{\alpha\_ext\_unc}$ as represented by $\hat{\lambda}_\alpha-(i_\alpha\times\hat{L}_q)$ to produce a signal $\hat{\lambda}_\alpha-(i_\alpha\times\hat{L}_q)+(\omega_i/\hat{\omega}_r)\hat{\lambda}_\beta$ that represents a corrected value of estimated extended rotor flux $\hat{\lambda}_{\lambda\_ext}$; and subtracting signal $(\omega_i/\hat{\omega}_r)\hat{\lambda}_\alpha$ from $\hat{\lambda}_{\beta\_ext\_unc}$ as represented by $\hat{\lambda}_\beta-(i_\beta\times\hat{L}_q)$ to produce a signal $\hat{\lambda}_\beta-(i_\beta\times\hat{L}_q)-(\omega_i/\hat{\omega}_r)\hat{\lambda}_\alpha$ representing $\hat{\lambda}_{\beta\_ext}$.

DETAILED DESCRIPTION OF THE INVENTION

Figure 1:
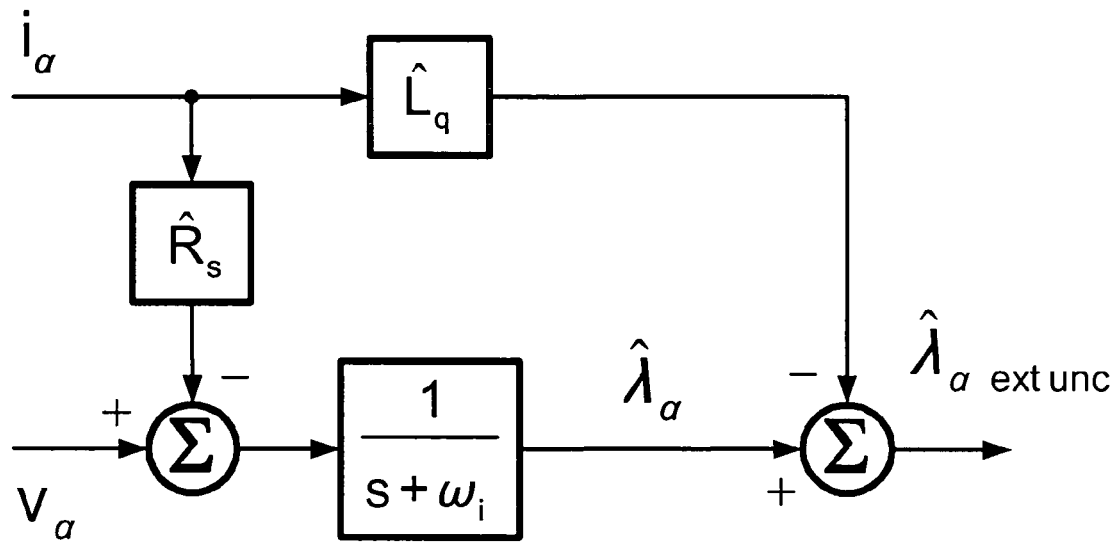
FIG. 1 is a block diagram of operations performed within a controller for controlling a dynamoelectric machine that calculates extended rotor flux according to the prior art.
Figure 1:
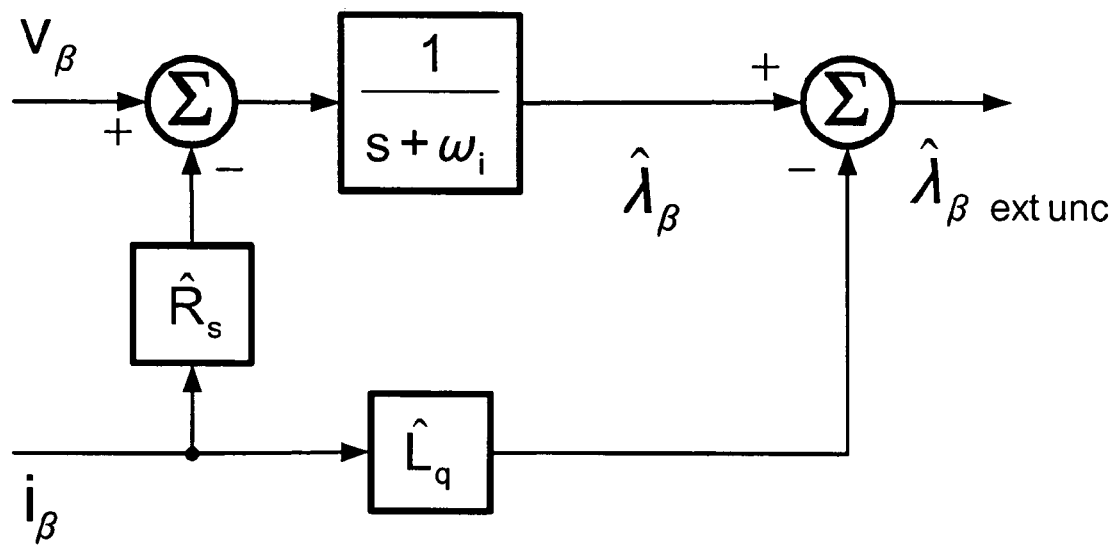

For Extended Flux Sensorless (EFS) control of a synchronous dynamoelectric machine, the following differential equations estimate the stator flux linkages in the α-β two-axis stationary reference frame using a lag approximation to a pure integrator:

$$\frac{d\hat{\lambda}_\alpha}{dt} = v_\alpha - \hat{R}_s \times i_\alpha - \omega_{efs} \times \hat{\lambda}_\alpha \quad (1)$$

$$\frac{d\hat{\lambda}_\beta}{dt} = v_\beta - \hat{R}_s \times i_\beta - \omega_{efs} \times \hat{\lambda}_\beta \quad (2)$$

where, $\lambda_\alpha$=α-axis stator flux estimate: V-sec
$\lambda_\beta$=β-axis stator flux estimate; V-sec
$v_\alpha$=α-axis stator potential; V
$v_\beta$=β-axis stator potential; V
$i_\alpha$=α-axis stator current; A
$i_\beta$=β-axis stator current; A
$\hat{R}_s$=estimated stator resistance; Ohm
$\omega_i$=lag function corner frequency; sec$^{-1}$ For alternating current (AC) steady state analysis, the transformation of these differential equations into Laplace transform notation is:

$$\hat{\lambda}_\alpha = \frac{v_\alpha - \hat{R}_s \times i_\alpha}{s + \omega_i} \quad (3)$$

$$\hat{\lambda}_\beta = \frac{v_\beta - \hat{R}_s \times i_\beta}{s + \omega_i} \quad (4)$$

where s=Laplace operator; sec$^{-1}$

The magnitudes of these two stator flux linkage estimates at an estimated electrical frequency of $\hat{\omega}_r$ are:

$$|\hat{\lambda}_\alpha| = \frac{|v_\alpha - \hat{R}_s \times i_\alpha|}{\sqrt{\hat{\omega}_r^2 + \omega_i^2}} \quad (5)$$

$$|\hat{\lambda}_\beta| = \frac{|v_\beta - \hat{R}_s \times i_\beta|}{\sqrt{\hat{\omega}_r^2 + \omega_i^2}} \quad (6)$$

and the angles are:

$$\angle\hat{\lambda}_\alpha = \angle(v_\alpha - \hat{R}_s \times i_\alpha) - \tan^{-1}\left(\frac{\hat{\omega}_r}{\omega_i}\right) \quad (7)$$

$$\angle\hat{\lambda}_\beta = \angle(v_\beta - \hat{R}_s \times i_\beta) - \tan^{-1}\left(\frac{\hat{\omega}_r}{\omega_i}\right) \quad (8)$$

Figure 2:
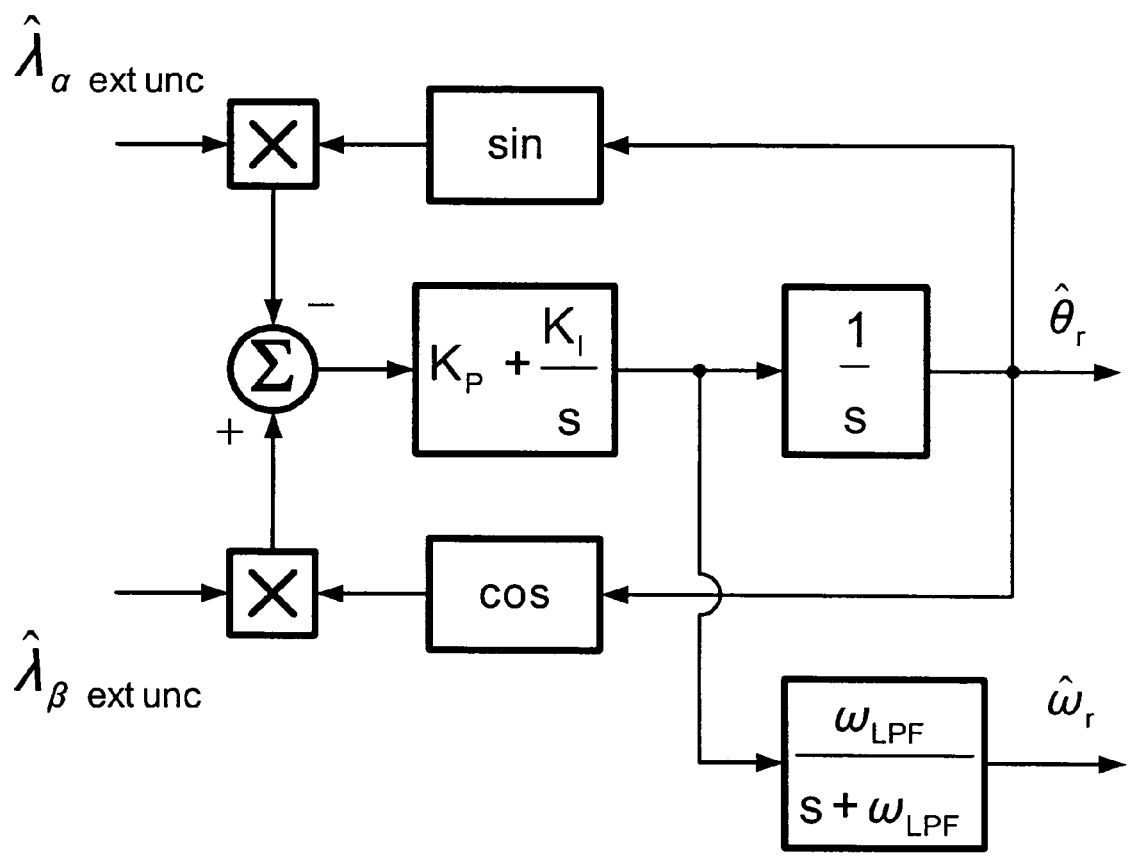
FIG. 2 is a block diagram of elements within a controller for controlling a dynamoelectric machine that estimates rotor angular position and velocity of the dynamoelectric machine using a phase lock loop (PLL) according to the prior art.

One convenient means for deriving the estimated rotor electrical frequency $\hat{\omega}_r$ is the phase locked loop described in Markunas et al. and shown in FIG. 2. Note that use of the phase locked loop forces the estimated rotor electrical frequency $\hat{\omega}_r$ to be equal to the synchronous electrical frequency $\omega_e$ of the terminal electrical potential applied to the dynamoelectric machine.

As compared to the results for a lag approximation, the amplitudes and angles for stator flux estimates determined using a pure integrator are:

$$|\hat{\lambda}_\alpha| = \frac{|v_\alpha - \hat{R}_s \times i_\alpha|}{\hat{\omega}_r} \quad (9)$$

$$|\hat{\lambda}_\beta| = \frac{|v_\beta - \hat{R}_s \times i_\beta|}{\hat{\omega}_r} \quad (10)$$

$$\angle\hat{\lambda}_\alpha = \angle(v_\alpha - \hat{R}_s \times i_\alpha) - \frac{\pi}{2} \quad (11)$$

$$\angle\hat{\lambda}_\beta = \angle(v_\beta - \hat{R}_s \times i_\beta) - \frac{\pi}{2} \quad (12)$$

Figure 3:
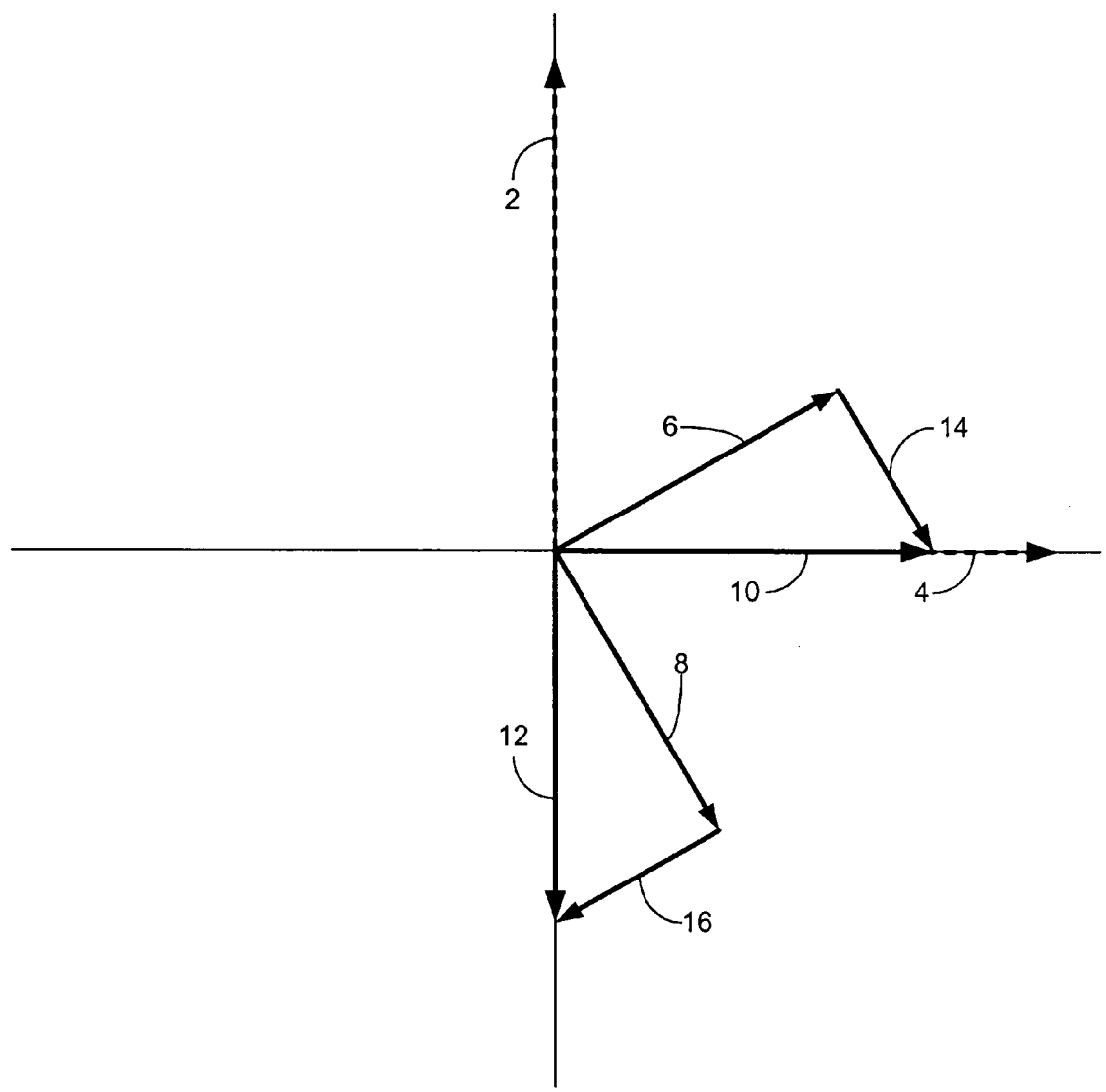
FIG. 3 is a phasor diagram that shows extended flux sensorless correction according to the invention.

FIG. 3 shows equations (5) through (12) graphically in phasor format. Phasors 2 and 4 represent net electrical potential phasors, $v_\alpha - \hat{R}_s \times i_\alpha$ and $v_\beta - \hat{R}_s \times i_\beta$, respectively. FIG. 3 arbitrarily aligns the α-axis net electrical potential phasor 2 with the y-axis. The alignment of the β-axis net electrical potential phasor 4 must then extend along the x-axis for a positive sequence 3-phase electrical potential waveform applied to the synchronous dynamoelectric machine terminals. In the α-β two-axis stationary reference frame, α-axis quantities lead β-axis quantities in time for positive sequence. Phasors 6 and 8 represent the estimated stator flux linkages $\hat{\lambda}_\alpha$ and $\hat{\lambda}_\beta$, respectively. Phasors 6 and 8 lag their respective net electrical potential phasors 2 and 4 by less than 90°. Phasors 10 and 12 represent estimated stator flux linkages determined using a pure integrator and do indeed lag their respective net electrical potential phasors 2 and 4 by exactly 90°. Phasors 10 and 12 also represent "corrected" estimated stator flux linkages $\hat{\lambda}_\alpha$ and $\hat{\lambda}_\beta$, respectively, as the correction algorithm disclosed herein results in nominally zero difference between the stator flux linkage estimate determined using a pure integrator and that using a lag approximation corrected by the scheme being disclosed herein. Phasors 14 and 16 represent phasors generated by the correction algorithm that vectorially add to phasors 4 and 6 to create phasors 10 and 12, as described herein.

Figure 4:
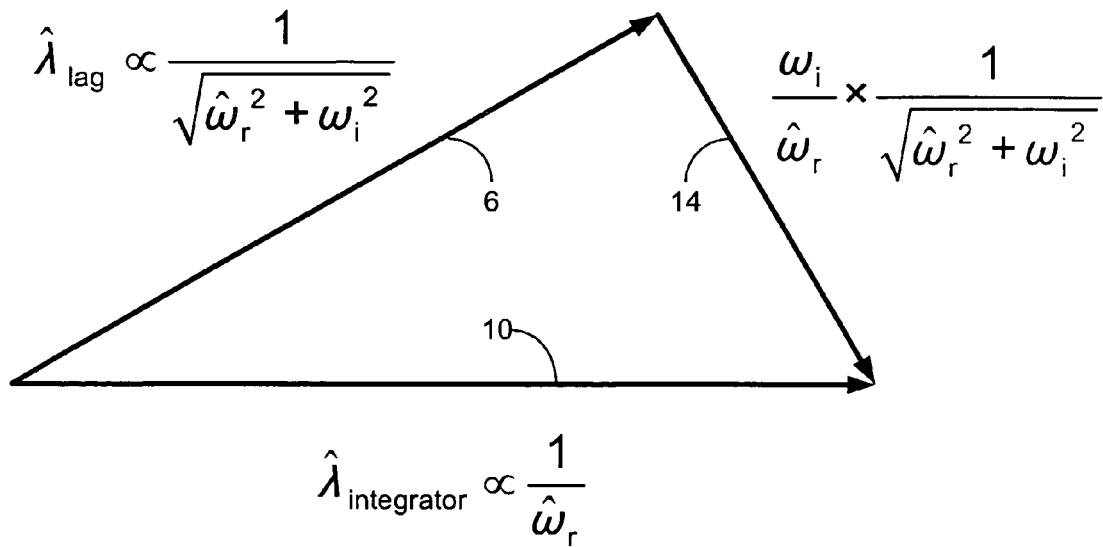
FIG. 4 is an estimated flux linkage triangle that shows extended flux linkage according to the invention.

FIG. 4 shows a right triangle formed by phasors 6, 10 and 14 from FIG. 3. Phasor 10 represents the hypotenuse of the right triangle, and it is proportional in length to the magnitude of the α-axis stator flux linkage estimated using a pure integrator. Phasor 6 represent the adjacent side of the right triangle, and it is proportional in length to the magnitude of the α-axis stator flux linkage estimated using a lag approximation. Since the magnitude of phasor 10 is proportional to $1/\hat{\omega}_r$ and the magnitude of phasor 6 is proportional to $1/\sqrt{\hat{\omega}_r^2 + \omega_i^2}$, the magnitude of phasor 14 is necessarily proportional to $$(\omega_i/\hat{\omega}_r)\sqrt{\hat{\omega}_r^2 + \omega_i^2}.$$

Figure 5:
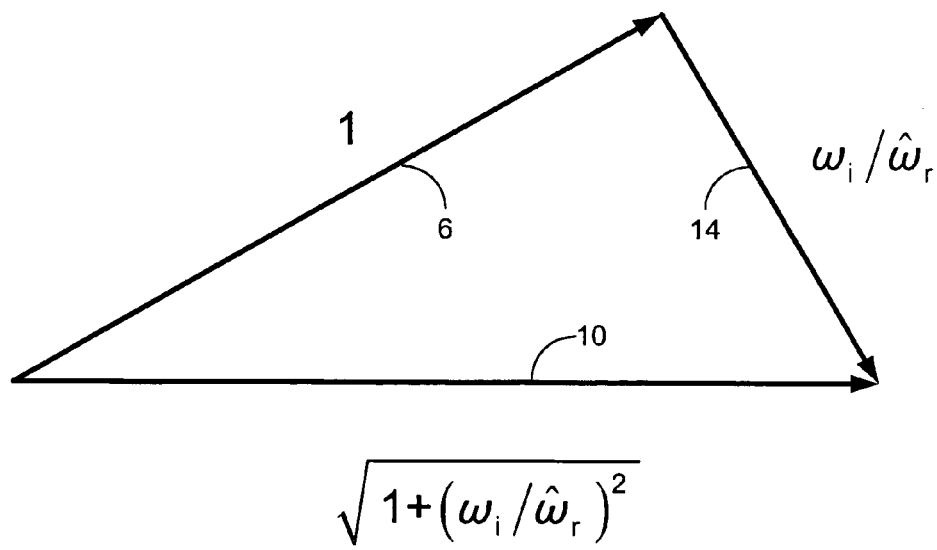
FIG. 5 is an estimated flux linkage similar triangle according to the invention.

FIG. 5 shows a similar right triangle formed by phasors 6, 10 and 14 and dividing the magnitude of each of the sides by $\sqrt{\hat{\omega}_r^2 + \omega_i^2}$. As can be seen the adjacent side of the right triangle represented by phasor 6 now has a length of unity and the hypotenuse of the triangle represented by phasor 10 is formed by vectorially adding $\hat{\lambda}_\alpha$ and $(\omega_i/\hat{\omega}_r) \times \hat{\lambda}_\beta$. The mathematical expression for the corrected α-axis extended flux linkage is:

$$\hat{\lambda}_{\alpha\ corrected} = \hat{\lambda}_\alpha + (\omega_i/\hat{\omega}_r) \times \hat{\lambda}_\beta \quad (13)$$

and similarly, the mathematical expression for the corrected β-axis extended flux linkage is:

$$\hat{\lambda}_{\beta\ corrected} = \hat{\lambda}_\beta - (\omega_i/\hat{\omega}_r) \times \hat{\lambda}_\alpha \quad (14)$$

Figure 6:
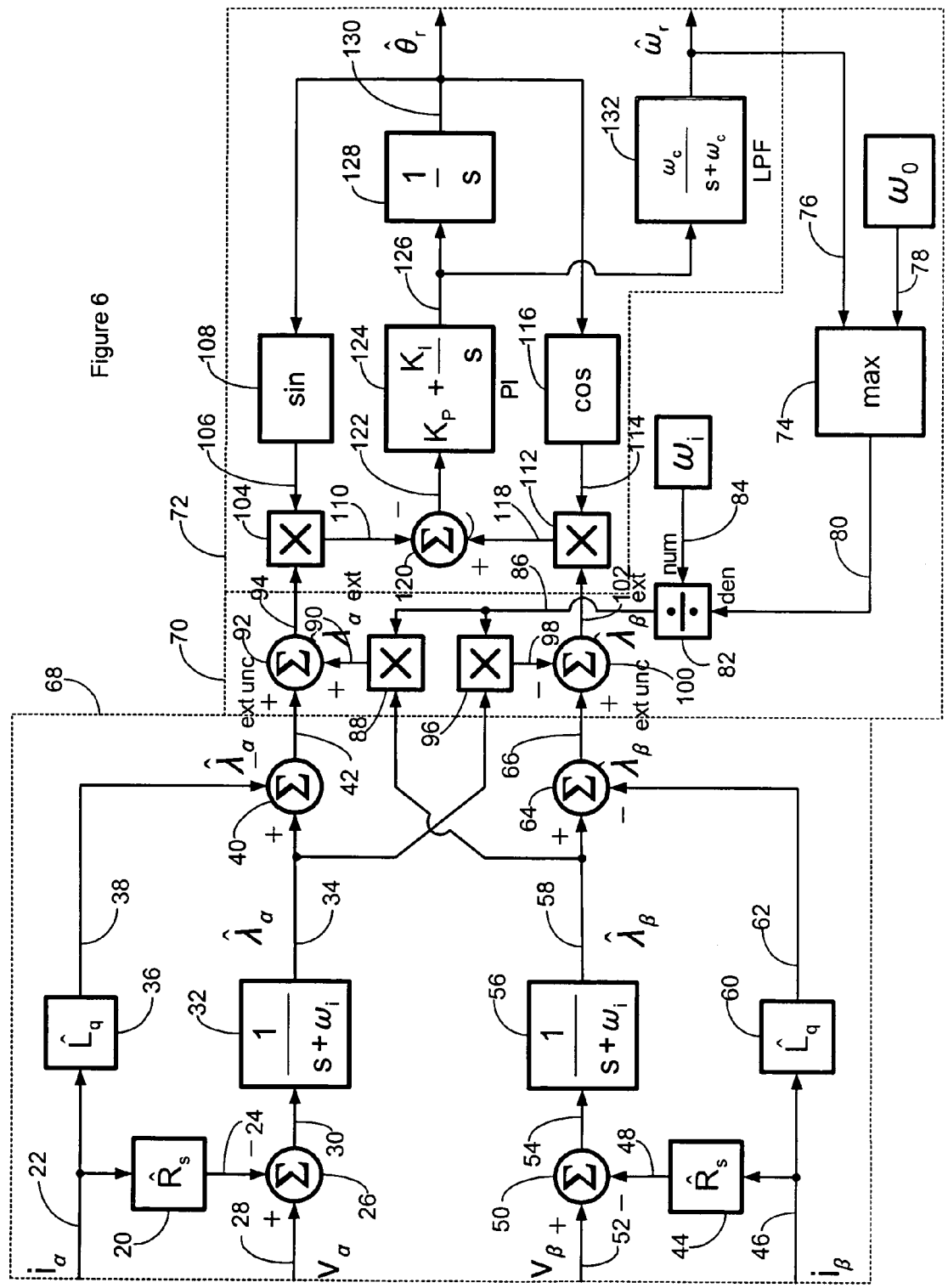
FIG. 6 is an estimated flux sensorless block diagram with correction algorithm according to the invention.

The extended flux linkages can be determined with these corrected estimates of stator flux linkages as shown in FIG. 1 and passed to the phase-locked-loop shown in FIG. 2. FIG. 6 shows an overall block diagram of an EFS system 18 according to the invention with the correction algorithm included. As described in Markunas et al., a special lag function $$\frac{1}{s+\omega_i}$$

substitutes for the pure integrator $$\frac{1}{s},$$

wherein $\omega_i$ is a corner frequency of the lag function. An $\hat{R}_s$ function 20 representing estimated stator resistance multiplies α-axis current on a signal path 22 by $\hat{R}_s$ to produce a signal $\hat{R}_s \times i_\alpha$ on a signal path 24. A summer 26 subtracts $\hat{R} \times i_\alpha$ on the signal path 24 from the α-axis potential $v_\alpha$ on a signal path 28 to produce a signal $v_\alpha - (\hat{R}_s \times i_\alpha)$ on a signal path 30. A $$\frac{1}{s+\omega_i}$$

lag function 32 as described above multiplies $v_\alpha - (\hat{R}_s \times i_\alpha)$ on the signal path 30 by $$\frac{1}{s+\omega_i}$$

to produce a signal $$\frac{1}{s+\omega_i}(V_\alpha + (\hat{R}_s \times i_\alpha))$$

on a signal path 34 that represents estimated α-axis stator flux $\hat{\lambda}_\alpha$. An $\hat{L}_q$ function 36 representing estimated q-axis inductance of the dynamoelectric machine multiples the α-axis current $i_\alpha$ on the signal path 20 by $\hat{L}_q$ to produce a signal $i_\alpha \times \hat{L}_q$ on a signal path 38. Another summer 40 subtracts $i_\alpha \times \hat{L}_q$ on the signal path 38 from $\hat{\lambda}_\alpha$ on the signal path 34 to produce an uncorrected estimated α-axis extended rotor flux signal $\hat{\lambda}_{\alpha\ ext\ unc}$ as represented by $\hat{\lambda}_\alpha - (-i_\alpha \times \hat{L}_q)$ on a signal path 42.

Uncorrected estimated β-axis extended rotor flux $\hat{\lambda}_{\beta\ ext\ unc}$ is determined in a similar way. An $\hat{R}_s$ function 44 representing estimated stator resistance multiplies β-axis current on a signal path 46 by $\hat{R}_s$ to produce a signal $\hat{R}_s \times i_\beta$ on a signal path 48. Another summer 50 subtracts $\hat{R}_s \times i_\beta$ on the signal path 48 from β-axis potential $v_\beta$ on a signal path 52 to produce a signal $v_\beta - (\hat{R}_s \times i_\beta)$ on a signal path 54.

Another $$\frac{1}{s+\omega_i}$$

lag function 56 multiplies $v_\beta - (\hat{R}_s \times i_\beta)$ on the signal path 54 by $$\frac{1}{s+\omega_i}$$

to produce a signal $$\frac{1}{s+\omega_i}(V_\beta + (\hat{R}_s \times i_\beta))$$

on a signal path 58 that represents estimated β-axis stator flux $\hat{\lambda}_\beta$. Another $\hat{L}_q$ function 60 representing estimated q-axis inductance of the dynamoelectric machine multiplies the β-axis current $i_\alpha$ on the signal path 46 by $\hat{L}_q$ to produce a signal $i_\beta \times \hat{L}_q$ on a signal path 62. Another summer 64 subtracts $i_\beta \times \hat{L}_q$ on the signal path 62 from $\hat{\lambda}_\beta$ on the signal path 58 to produce an uncorrected estimated β-axis extended rotor flux signal $\hat{\lambda}_{\beta\ ext\ unc}$ as represented by $\hat{\lambda}_\beta - (i_\beta \times \hat{L}_q)$ on a signal path 66. These operations together comprise an uncorrected extended rotor flux estimation calculation system 68 according to the prior art as described in Markunas et al. and shown in FIG. 1.

According to the invention, an estimated extended rotor flux correction algorithm 70 corrects deviations of $\hat{\lambda}_{\alpha\ ext\ unc}$ and $\hat{\lambda}_{\beta\ ext\ unc}$ as described above to generate corrected values of estimated extended rotor flux $\hat{\lambda}_{\alpha\ ext}$ for the α-axis and $\hat{\lambda}_{\beta\ ext}$ for the β-axis that closely approximate values that would result from operations with a pure integrator $$\frac{1}{s}.$$

A digital PLL 72 as described in Markunas et al. and shown in FIG. 2 derives estimated rotor electrical frequency $\hat{\omega}_r$ and estimated rotor electrical position $\hat{\theta}_r$ of the dynamoelectric machine rotor from the corrected estimated extended rotor flux $\hat{\lambda}_{\alpha\ ext}$ for the α-axis and $\hat{\lambda}_{\beta\ ext}$ for the β-axis that the correction algorithm 70 generates.

The description of the correction algorithm 70 is as follows. A comparator 74 compares a signal representing the estimated rotor electrical frequency $\hat{\omega}_r$ on a signal line 76 with a signal representing a minimum frequency $\omega_o$ on a signal path 78 to avoid dividing by zero or overflowing the resulting ratio, $\omega_i/\hat{\omega}_r$, in fixed point math processors. The comparator 74 selects the higher level of these two signals to produce a signal representing a selected estimated rotor electrical frequency $\hat{\omega}_r$ on a signal path 80. A divider function 82 divides the lag function corner frequency $\hat{\omega}_i$ on a signal path 84 by the selected estimated rotor electrical frequency $\hat{\omega}_r$ to produce a signal $\omega_i/\hat{\omega}_r$ on a signal path 86.

A multiplier 88 multiplies the signal $\omega_i/\hat{\omega}_r$ on the signal path 86 by the signal $\hat{\lambda}_\beta$ on the signal path 58 to produce a signal $(\omega_i/\hat{\omega}_r)\hat{\lambda}_\beta$ on a signal path 90. A summer 92 adds the uncorrected estimated α-axis extended rotor flux signal $\hat{\lambda}_{\alpha\ ext\ unc}$ as represented by $\hat{\lambda}_\alpha - i_\alpha \times \hat{L}_q$ on the signal path 42 to the signal $(\omega_i/\hat{\omega}_r)\hat{\lambda}_\beta$ on the signal path 90 to produce a signal $\hat{\lambda}_\alpha - i_\alpha \times \hat{L}_q + (\omega_i/\hat{\omega}_r)\hat{\lambda}_\beta$ representing $\hat{\lambda}_{\alpha\ ext}$ on a signal path 94.

Similarly, a multiplier 96 multiplies the signal $\omega_i/\hat{\omega}_r$ on the signal path 86 by the signal $\hat{\lambda}_\alpha$ on the signal path 34 to produce a signal $(\omega_i/\hat{\omega}_r)\hat{\lambda}_\alpha$ on a signal path 98. A summer 100 subtracts the signal $(\omega_i/\hat{\omega}_r)\hat{\lambda}_\alpha$ on the signal path 98 from the uncorrected estimated β-axis extended rotor flux signal $\hat{\lambda}_{\beta\ ext\ unc}$ as represented by $\hat{\lambda}_\beta - i_\beta \times \hat{L}_q$ on the signal path 66 to produce a signal $\hat{\lambda}_\beta - i_\beta \times \hat{L}_q - (\omega_i/\hat{\omega}_r)\hat{\lambda}_\alpha$ representing $\hat{\lambda}_{\beta\ ext}$ on a signal path 102.

The signal $\hat{\lambda}_\alpha - i_\alpha \times \hat{L}_q + (\omega_i/\hat{\omega}_r)\hat{\lambda}_\beta$ representing $\hat{\lambda}_{\alpha\ ext}$ on the signal path 94 and the signal $\hat{\lambda}_\beta - i_\beta \times \hat{L}_q - (\omega_i/\hat{\omega}_r)\hat{\lambda}_\alpha$ representing $\hat{\lambda}_{\beta\ ext}$ on a signal path 102 serve as inputs to the digital PLL 72. A multiplier 104 multiplies the corrected estimated α-axis extended rotor flux $\hat{\lambda}_{\alpha\ ext}$ with a feedback signal on a signal path 106 from a sine function 108 to produce an α-axis multiplier output signal on a signal path 110. Likewise, a multiplier 112 multiplies the corrected estimated β-axis extended rotor flux $\hat{\lambda}_{\beta\ ext}$ with a feedback signal on a signal path 114 from a cosine function 116 to produce a β-axis multiplier output signal on a signal path 118.

A summer 120 subtracts the α-axis multiplier output signal on the signal path 110 from the β-axis multiplier output signal on a signal path 118 to produce a difference signal on a signal path 122. A proportional plus integral regulator (PI) function 124 multiplies the difference signal on the signal path 122 by the function $$K_p + \frac{K_i}{s}$$

to produce a PI output signal on a signal path 126, wherein $K_p$ and $K_i$ are the proportional and integral gains of the PI function 124, respectively.

An integral function 128 multiplies the PI output signal on the signal path 126 by the function $$\frac{1}{s}$$

to produce an integration output signal on a signal path 130. The integration output signal on the signal path 130 serves as the input signal for both the sine function 108 and the cosine function 116 to provide the PLL. The integration output signal on the signal path 130 therefore represents the estimated rotor electrical position $\theta_r$.

A low pass filter (LPF) function 132 multiplies the PI output signal on the signal path 126 by the function $$\frac{\omega_c}{s + \omega_c},$$

where $\omega_c$ is the corner frequency of the LPF function 132 to produce the estimated rotor electrical angular velocity $\hat{\omega}_r$ on the signal path 76. The LPF function 132 is desirable to better attain a smooth signal for the estimated rotor electrical frequency $\hat{\omega}_r$.

The corrected EFS control algorithm is only effective above some minimum dynamoelectric machine fundamental electrical frequency. Below this frequency, the correction algorithm described in equations (13) and (14) becomes inaccurate due to sensor inaccuracies, digital word length effects, and measurement and computation noise. Test results to date were able to demonstrate acceptable accuracy above an approximate 10 Hz electrical frequency. Below this threshold speed, determination of rotor position for inverter commutation requires the use of alternative means.

Described above is a method of correcting the determination of extended rotor flux using a lag function and a correction algorithm that closely approximates a pure integrator function to correct for lag function errors. The described embodiment of the invention is only an illustrative implementation of the invention wherein changes and substitutions of the various parts and arrangement thereof are within the scope of the invention as set forth in the attached claims.

What is claimed is:

1. For a system that derives an estimated rotor electrical position $\hat{\theta}_r$ and electrical frequency $\hat{\omega}_r$ for the rotor of a polyphase alternating current (AC) dynamoelectric machine with an extended rotor flux estimation calculation system that generates uncorrected estimated values of extended rotor flux $\hat{\lambda}_{\alpha\ ext\ unc}$ and $\hat{\lambda}_{\beta\ ext\ unc}$ based on derived values of estimated stator flux $\hat{\lambda}_\alpha$ and $\hat{\lambda}_\beta$, the α-β two-axis stationary reference frame using a lag function $$\frac{1}{s + \omega_i}$$

that approximates a pure integrator function $$\frac{1}{s},$$

wherein $\omega_i$ represents a corner frequency of the lag function, and a digital phase lock loop (PLL) to determine values of estimated rotor electrical position $\hat{\theta}_r$ and electrical frequency $\hat{\omega}_r$ based upon the estimated values of extended rotor flux $\hat{\lambda}_{\alpha\ ext}$ and $\hat{\lambda}_{\beta\ ext}$, a method of correcting the estimated α-axis and β-axis values of estimated extended rotor flux to more closely approximate values generated with a pure integrator function $$\frac{1}{s},$$

comprising the steps of:

dividing the lag function $$\frac{1}{s+\omega_i}$$

corner frequency $\omega_i$ by the estimated rotary frequency $\hat{\omega}_r$ to generate a signal $\omega_i/\hat{\omega}_r$;

multiplying the signal $\omega_i/\hat{\omega}_r$ by the derived values of estimated stator flux $\hat{\lambda}_\alpha$ and $\hat{\lambda}_\beta$ to produce signals $(\omega_i/\hat{\omega}_r)\hat{\lambda}_\alpha$ and $(\omega_i/\hat{\omega}_r)\hat{\lambda}_\beta$;

adding signal $(\omega_i/\hat{\omega}_r)\hat{\lambda}_\beta$ to $\hat{\lambda}_{\alpha\ ext\ unc}$ as represented by $\hat{\lambda}_\alpha - (i_\alpha \times \hat{L}_q)$ to produce a signal $\hat{\lambda}_\alpha(i_\alpha \times \hat{L}_q) + (\omega_i/\hat{\omega}_r)\hat{\lambda}_\beta$ that represents a corrected value of estimated extended rotor flux $\hat{\lambda}_{\alpha\ ext}$; and subtracting signal $(\omega_i/\hat{\omega}_r)\hat{\lambda}_\alpha$ from $\hat{\lambda}_{\beta\ ext\ unc}$ as represented by $\hat{\lambda}_\beta - (i_\beta \times \hat{L}_q)$ to produce a signal $\hat{\lambda}_\beta - (i_\beta \times \hat{L}_q) - (\omega_i/\hat{\omega}_r)\hat{\lambda}_\alpha$ representing $\hat{\lambda}_{\beta\ ext}$.

2. The method of claim 1, further comprising the step of selecting a value for the estimated rotor electrical frequency $\hat{\omega}_r$ that is at least a minimum frequency $\omega_o$ to prevent the step of dividing from dividing by zero or overflowing the resulting ratio, $\omega_i/\hat{\omega}_r$.

3. The method of claim 2, wherein the step of selecting comprises the steps of:

comparing a value of $\hat{\omega}_r$ generated by the digital PLL with the minimum frequency $\omega_o$; and selecting the higher one of the value of $\hat{\omega}_r$ generated by the digital PLL and the value of the minimum frequency $\omega_o$ as $\hat{\omega}_r$ for the step of dividing.

4. For a system that derives an estimated rotor electrical position $\hat{\theta}_r$ and electrical frequency $\hat{\omega}_r$ for the rotor of a polyphase alternating current (AC) dynamoelectric machine with an extended rotor flux estimation calculation system that generates uncorrected estimated values of extended rotor flux $\hat{\lambda}_{\alpha\ ext\ unc}$ and $\hat{\lambda}_{\beta\ ext\ unc}$ based on derived values of estimated stator flux $\hat{\lambda}_\alpha$ and $\hat{\lambda}_\beta$ the $\alpha$-$\beta$ two-axis stationary reference frame using a lag function $$\frac{1}{s+\omega_i}$$

that approximates a pure integrator function $$\frac{1}{s},$$

wherein $\omega_i$ represents a corner frequency of the lag function, and a digital phase lock loop (PLL) to determine values of estimated rotor electrical position $\hat{\theta}_r$ and electrical frequency $\hat{\omega}_r$ based upon the estimated values of extended rotor flux $\hat{\lambda}_{\alpha\ ext}$ and $\hat{\lambda}_{\beta\ ext}$, apparatus for correcting the estimated $\alpha$-axis and $\beta$-axis values of estimated extended rotor flux to more closely approximate values generated with a pure integrator function $$\frac{1}{s},$$

comprising:

a divider for dividing the lag function $$\frac{1}{s+\omega_i}$$

corner frequency $\omega_i$ by the estimated rotor electrical frequency $\hat{\omega}_r$ to generate a signal $\omega_i/\hat{\omega}_r$;

a multiplier multiplying the signal $\omega_i/\hat{\omega}_r$ by the derived values of estimated stator flux $\hat{\lambda}_\alpha$ and $\hat{\lambda}_\beta$ to produce signals $(\omega_i/\hat{\omega}_r)\hat{\lambda}_\alpha$ and $(\omega_i/\hat{\omega}_r)\hat{\lambda}_\beta$;

a first summer for adding signal $(\omega_i/\hat{\omega}_r)\hat{\lambda}_\beta$ to $\hat{\lambda}_{\alpha\ ext\ unc}$ as represented by $\hat{\lambda}_\alpha - (i_\alpha \times \hat{L}_q)$ to produce a signal $\hat{\lambda}_\alpha - (i_\alpha \times \hat{L}_q) + (\omega_i/\hat{\omega}_r)\hat{\lambda}_\beta$ that represents a corrected value of estimated extended rotor flux $\hat{\lambda}_{\alpha\ ext}$; and a second summer for subtracting signal $(\omega_i/\hat{\omega}_r)\hat{\lambda}_\alpha$ from $\hat{\lambda}_{\beta\ ext\ unc}$ as represented by $\hat{\lambda}_\beta - (i_\beta \times \hat{L}_q)$ to produce a signal $\hat{\lambda}_\beta - (i_\beta \times \hat{L}_q) - (\omega_i/\hat{\omega}_r)\hat{\lambda}_\alpha$ representing $\hat{\lambda}_{\beta\ ext}$.

5. The system of claim 4, further comprising a selector that selects a value for the estimated rotor electrical frequency $\hat{\omega}_r$ that is at least a minimum frequency $\omega_o$ to prevent the divider from dividing by zero or overflowing the resulting ratio, $\omega_i/\hat{\omega}_r$.

6. The system of claim 5, wherein the selector comprises a comparator that compares a value of $\hat{\omega}_r$ generated by the digital PLL with the minimum frequency $\omega_o$; and selects the higher one of the value of $\hat{\omega}_r$ generated by the digital PLL and the value of the minimum frequency $\omega_o$ as $\hat{\omega}_r$ for the divider.

* * * * *